US009015719B2

(12) United States Patent
Elliott (10) Patent No.: US 9,015,719 B2
(45) Date of Patent: Apr. 21, 2015

(54) SCHEDULING OF TASKS TO BE PERFORMED BY A NON-COHERENT DEVICE

(75) Inventor: Robert Elliott, Cambridge (GB)

(73) Assignee: ARM Limited, Cambridge (GB)

( * ) Notice: Subject to any disclaimer, the term of this patent is extended or adjusted under 35 U.S.C. 154(b) by 374 days.

(21) Appl. No.: 13/405,537

(22) Filed: Feb. 27, 2012

(65) Prior Publication Data

US 2012/0246656 A1 Sep. 27, 2012

(30) Foreign Application Priority Data

Mar. 24, 2011 (GB) .................................. 1104958.2

(51) Int. Cl.
*G06F 9/46* (2006.01)
*G06F 13/00* (2006.01)
*G06F 9/26* (2006.01)
*G06F 9/48* (2006.01)

(52) U.S. Cl.
CPC ...... *G06F 9/4881* (2013.01); *G06F 2209/5017* (2013.01); *G06F 2209/484* (2013.01)

(58) Field of Classification Search
None
See application file for complete search history.

(56) References Cited

U.S. PATENT DOCUMENTS

| 5,845,327 | A | 12/1998 | Rickard et al. | |
|---|---|---|---|---|
| 2005/0219253 | A1 | 10/2005 | Piazza et al. | |
| 2006/0152519 | A1 * | 7/2006 | Hutchins et al. | 345/561 |
| 2006/0155933 | A1 * | 7/2006 | Buyuktosunoglu et al. | 711/133 |
| 2006/0277385 | A1 * | 12/2006 | von Praun et al. | 711/170 |
| 2007/0067606 | A1 * | 3/2007 | Lin et al. | 712/10 |
| 2007/0136730 | A1 * | 6/2007 | Wilt et al. | 718/102 |
| 2007/0226424 | A1 * | 9/2007 | Clark et al. | 711/141 |
| 2008/0215768 | A1 * | 9/2008 | Reid et al. | 710/22 |
| 2008/0303833 | A1 * | 12/2008 | Swift et al. | 345/505 |
| 2009/0070553 | A1 * | 3/2009 | Wallach et al. | 712/34 |
| 2010/0110069 | A1 * | 5/2010 | Yuan | 345/419 |
| 2011/0050713 | A1 | 3/2011 | McCrary et al. | |
| 2011/0252200 | A1 * | 10/2011 | Hendry et al. | 711/121 |
| 2013/0173894 | A1 * | 7/2013 | Yan et al. | 712/228 |

OTHER PUBLICATIONS

Search Report for UK 1104958.2 mailed Jul. 15, 2011.

(Continued)

*Primary Examiner* — Abdullah Al Kawsar
(74) *Attorney, Agent, or Firm* — Nixon & Vanderhye P.C.

(57) ABSTRACT

A method for scheduling tasks to be processed by one of a plurality of non-coherent processing devices, at least two of the devices being heterogeneous devices and at least some of said tasks being targeted to a specific one of the processing devices. The devices process data that is stored in local storage and in a memory accessible by at least some of the devices. The method includes the steps of: for each of a plurality of non-dependent tasks to be processed by the device, determining consistency operations required to be performed prior to processing the non-dependent task; performing the consistency operations for one of the non-dependent tasks and on completion issuing the task to the device for processing; performing consistency operations for a further non-dependent task such that, on completion of the consistency operations, the device can process the further task.

24 Claims, 4 Drawing Sheets

(56) References Cited

OTHER PUBLICATIONS

L.I. Kontothanassis et al, "Lazy Release Consistency for Hardware-Coherent Multiprocessors" Supercomputing '95, Dec. 1994, pp. 1-16.

P. Keleher et al, "TreadMarks: Distributed Shared Memory on Standard Workstations and Operating Systems" WTEC'94 Proceedings of the USENIX Winter 1994 Technical Conference, Jan. 17, 1994, 17 pages.

* cited by examiner

SCHEDULING OF TASKS TO BE PERFORMED BY A NON-COHERENT DEVICE

BACKGROUND OF THE INVENTION

This application claims priority to GB Application No. 1104958.2 filed Mar. 24, 2011, the entire contents of which are incorporated herein by reference.

1. Field of the Invention

The present invention relates to the field of data processing and in particular to the scheduling of tasks to be executed by non-coherent devices.

2. Description of the Prior Art

Systems that have a plurality of devices that interact with each other and with a memory system are known. Where the different devices have their own local storage for the data, problems in maintaining data coherency between the different local storage locations and memory may be encountered. Generally devices address this problem by performing consistency operations such as cache maintenance operations, the use of barriers and the flushing of local storage at certain points in execution where it is important that data is coherent with at least a portion of the rest of the system. Particular problems can be encountered with devices such as graphic processing units GPUs that have long pipelines. Waiting for the execution of a task by the GPU while consistency operations are being performed introduces bubbles into the pipeline, which in deep pipelines has significant disadvantages.

Devices of the prior art have either performed the consistency operations immediately, which generally results in multiple updates and therefore has a bandwidth cost associated with it but has low latency, or they have waited and performed the consistency operations together in a batch process, which avoids unnecessary multiple updates but increases latency.

It would be desirable to both reduce the latency associated with such consistency operations without unduly affecting the bandwidth.

SUMMARY OF THE INVENTION

Viewed from a first aspect, the present invention provides a method for scheduling tasks to be processed by one of a plurality of non-coherent processing devices, at least two of said plurality of non-coherent processing devices being heterogeneous devices and at least some of said tasks being targeted to a specific one of said plurality of non-coherent processing devices, said non-coherent processing devices processing data that is stored in local storage and in a memory accessible by at least some of said plurality of non-coherent processing devices said method comprising: for each of a plurality of non-dependent tasks to be processed by said non-coherent processing device determining consistency operations required to be performed prior to processing said non-dependent task; performing said consistency operations for one of said non-dependent tasks and on completion issuing said task to said processing device for processing; performing consistency operations for a further non-dependent task such that on completion of said consistency operations said non-coherent processing device can process said further task.

The present invention recognises that although multiple consistency operations may need to be performed before devices are consistent with each other and can freely pass data between them, in order for a non-coherent device to perform a particular task there may be only a subset of the complete consistency operations that need to be performed for this task to execute safely. Thus, rather than performing all consistency operations the present invention determines the consistency operations that are necessary for a particular task and performs just those. When they have completed the task can be issued to the non-coherent device for processing while in parallel consistency operations required for a subsequent task can be performed. Once these have completed the subsequent task is ready to be processed by the non-coherent device.

As generally in any well designed system, consistency operations will take less time than the task associated with them, the consistency operations for the subsequent task will complete before the previous task has executed and thus the subsequent task will be ready to be issued for execution before the device is ready to execute it. Thus, the latency introduced into the system by the consistency operations is generally just the latency associated with the consistency operations for the first task.

It should be noted that at least some of the devices are heterogeneous devices and at least some of the tasks are targeted to particular devices. This is different to devices with homogeneous cores where tasks can be redirected to different cores depending on availability and loading. Heterogeneous devices are devices that have different properties or capabilities in their execution ability. For example, the execution performance of a GPU with dedicated image manipulation circuitry will be more efficient and significantly faster than the equivalent software on a CPU. This difference may be so pronounced that it would not be not feasible to choose to do the work on the slower device to avoid the need for the consistency work. In other devices functionality may be entirely lacking on one device, so that it would be incapable of performing certain functions. The current invention is concerned with circumstances where tasks cannot at least in some cases be ported between devices.

Thus, a constraint of operation for embodiments of this invention and for their implementation is that devices are pre-selected and thus, their selection cannot be used as another dimension of optimisation.

In some embodiments, a non-dependent task is a task that is independent of all tasks that prior to processing require consistency operations to be performed, said method comprising a further step of following said step of performing said consistency operations for said one of said non-dependent tasks of re-evaluating any tasks dependent on said one of said non-dependent task to determine if said any tasks are dependent or non-dependent, before said step of consistency operations for a further non-dependent task is performed.

A non-dependent task might be viewed as a task that is not dependent on any other pending task to be processed. However, in the context of this embodiment a non-dependent task is one that is not dependent on any other pending task for which consistency operations need to be performed. For example, if tasks a, b, c and d have the following dependencies: a=>b=>d, and c=>d, that is a must be executed before b and b before d, and c must be executed before d, then initially a and c are viewed as non-dependent tasks. However, once the consistency operations have been performed for task a, then independently of whether or not task a is complete, b is viewed as a non-dependent task, such that if the consistency operations for task b are smaller than those for task c they can be performed first. Thus, after each consistency task completes the order of consistency work can be re-evaluated, in the light of whether or not a task is now considered non-dependent.

In some embodiments, said non-coherent processing device comprising a task queue store for storing at least one task in a queue prior to execution of said task, and on completion of said consistency operations for said further non-dependent task transmitting said further task to said non-coherent processing device to be processed or stored in said task store queue awaiting processing if said non-coherent processing device is processing an earlier task.

It may be advantageous if the non-coherent processing device has a task queue store for storing at least one task in a queue. If this is the case then following completion of the consistency operations for the further task, this further task can be transmitted to the non-coherent processing device and can sit in the queue awaiting execution and can be executed as soon as the non-coherent processing device is ready to execute it. In this way no bubbles will appear in the pipeline at this point as it will not need to await the consistency operations of the further task to be performed, the further task will be waiting in the queue ready to be executed.

In some embodiments said method comprises an initial step of determining portions of said tasks that can be executed independently of each other and subdividing said tasks where possible into said plurality of non-dependent tasks.

It may be advantageous to determine which are the most appropriate atomic tasks to subdivide the tasks into. In other words what is the smallest subdivision of the non-dependent tasks that can be made. By subdividing the tasks into small divisions the latency of the system can be reduced, as in this way consistency operations can be performed for a small task and then that task can be executed while consistency operations of a next task are performed.

In some embodiments said method comprises a step following said initial step of determining dependencies of said tasks and providing an ordering of said tasks to reduce initial latency.

Once the tasks have been subdivided into non-dependent tasks, an ordering can be performed by the scheduler based on the size of consistency work for each task to reduce initial latency. Thus, the task with the smallest consistency work may be selected to be performed first.

In other embodiments, following performing said consistency operations for said further non-dependent task said method stores said further task in a privileged queue ready for output to said non-coherent device in response to an indication that it is ready to process said further task.

If there is no task queue store on the non-coherent processing device then it may be advantageous if the further task is stored in a privileged queue which may be in the form of a ring buffer. This queue may be on the device performing the coherency operations or it may be in memory. The task will be present in this privileged queue ready for output. When the non-coherent device is ready to process a further task it signals this to the device performing the consistency operations, and the task can then be transferred to it quickly and efficiently. This avoids the non-coherent device waiting too long for a further task. One drawback of this system is that there is more communication required between different devices.

In some embodiments said consistency operations comprise at least one of coherency operations and other data transfer operations to ensure consistency between said plurality of processing devices and said memory.

The consistency operations performed are operations such as coherency operations to make the data coherent. There may be other operations that are required for the devices to operate consistently. For example it may involve the copying of aliases.

In some embodiments, the method further comprises performing consistency operations for a plurality of further non-dependent tasks and on completion of said consistency operations for each of said plurality of further tasks, determining if said non-coherent processing device has capacity to receive said further task and in response to said non-coherent processing device having capacity issuing said further task to said non-coherent processing device.

Embodiments of the present invention are particularly advantageous if the consistency operations for all non-dependent tasks awaiting execution on the non-coherent processing device are performed one after the other. If this is the case then these tasks are ready as soon as these non-coherent operations have been performed to be issued to the non-coherent processing device.

The tasks may be issued to the non-coherent processing device in response to an indication from the non-coherent processing device indicating that its task queue store has capacity. If such a signal is received then any tasks whose coherency operations have completed can be transferred. In many embodiments, the task queue can store several tasks in parallel and thus, a single transmission can be used to transmit these tasks between the two devices thereby saving time and power.

In some embodiments, said method further comprises receiving from said non-coherent processing device an indication that said task queue store has capacity and in response to said indication and no task with consistency operations that are complete, noting said indication such that on completion of pending consistency operations a corresponding task can be placed in said queue.

If an indication is received that the task queue store has capacity and there are currently no consistency operations that have completed then in response to this, the system may note this indication and on completion of pending consistency operations a corresponding task can be placed in the queue. In this way a further task can be sent across to the non-coherent device for storage in the task queue when it is ready and hopefully in time to avoid bubbles appearing in the pipeline.

In some embodiments, said step of determining consistency operation to be performed for each of said tasks includes determining which of said tasks has a smallest number of consistency operations associated with it and performing said smallest number of consistency operations and issuing said task to said non-coherent processing device before performing said other consistency operations and tasks.

It may be advantageous to determine which task has the smallest number of consistency operations with the smallest latency. If this is done then a task can be sent to the non-coherent processing device as soon as these operations are finished and thus, more quickly than if a task with more coherency operations had been selected. In this way the latency of the system is reduced. The further larger latency consistency operations can then be performed while the task with the smallest latency consistency operations is processed. As noted previously in a well behaved system the tasks generally take longer than the coherency operations and thus, the next task should have its coherency operations completed and be ready for processing before the previous task has completed.

In some embodiments, said non-coherent processing device processing said tasks comprises a graphics processing unit with a deep pipeline.

Although the non-coherent processing device may be a number of things it is particularly advantageous for graphics processing units that have deep pipelines. It is particularly disadvantageous for bubbles to appear in deep pipelines and thus, performing the coherency operations in this way and reducing the latency with which tasks are sent to the graphics processing unit can help to reduce bubbles and improve the performance of the system.

In some embodiments, said consistency operations are performed on a non-coherent central processing unit.

Although the consistency operations could be performed on a number of processing devices, often it is a central processing unit that performs the scheduling and the consistency operations.

A second aspect of the present invention provides a computer program product comprising a program which when executed by a processor will control said processor to perform steps in a method according to a first aspect of the present invention.

A third aspect of the present invention provides a data processing apparatus comprising: a plurality of non-coherent processing devices for processing data, at least some of said non-coherent processing devices comprising local data storage; a memory for storing data accessible by at least some of said plurality of non-coherent processing devices; and scheduling circuitry for scheduling tasks to be performed by at least one of said plurality of non-coherent processing devices; wherein said at least one of said non-coherent processing device comprises a task queue store for storing at least one task awaiting execution; said scheduling circuitry being configured for each of a plurality of non-dependent tasks to be executed by one of said non-coherent processing devices to determine consistency operations that are required to be performed prior to execution of said task and to schedule performance of said consistency operations and on completion to issue said task to be executed by said non-coherent processing device and to perform consistency operations for a further task.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
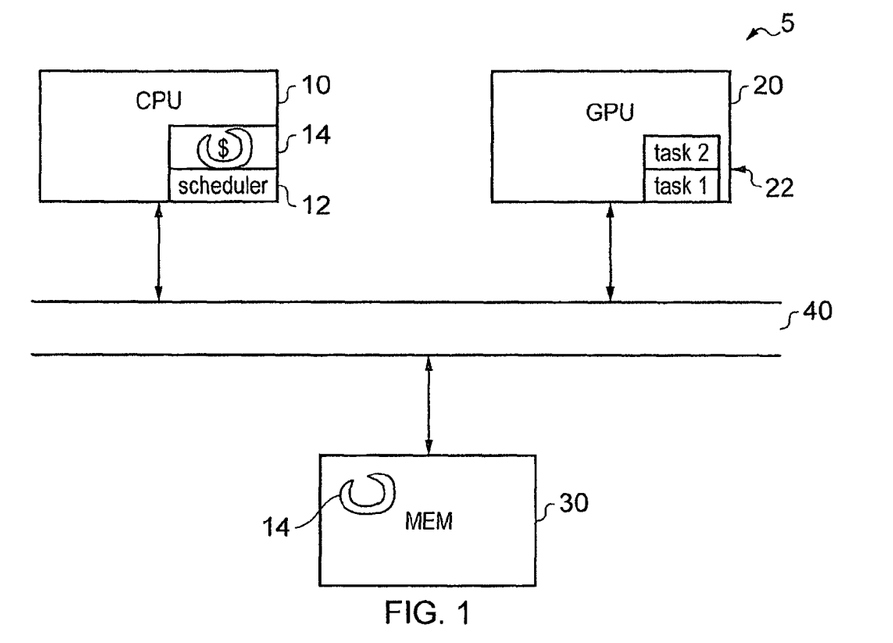
FIG. 1 shows a data processing apparatus according to an embodiment of the present invention.

FIG. 1 shows a data processing apparatus 5 having a central processing unit CPU 10 a graphics processing unit GPU 20 and a memory 30. The central processing unit and graphics processing unit communicate with each other and with the memory via a bus 40.

Figure 3:
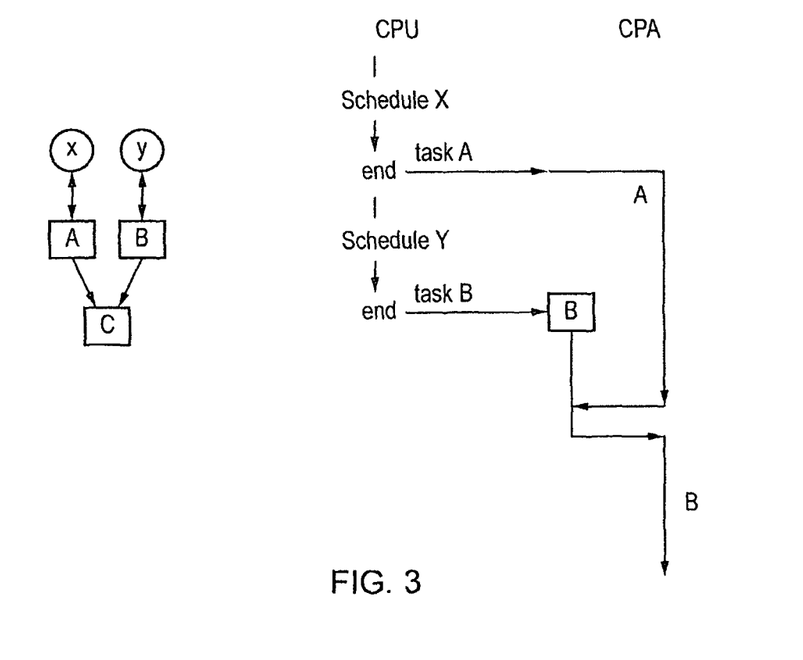
FIG. 3 schematically shows the scheduling of independent tasks and their coherency operations.

Central processing unit 10 has a scheduler 12 for scheduling a plurality of tasks to be executed. In some embodiments the scheduler may subdivide the tasks into the smallest division of non-dependent tasks prior to scheduling them. In the basic case the scheduler may have the user specifying tasks in their minimal form (such as is shown in FIG. 3), or the scheduler may use criteria to subdivide the tasks that are dependent on the sequences of instructions used in the task itself. The tasks themselves are general purpose computation (as would be performed by a CPU), as such the code may or may not have side effects which prevent subdivision.

For example, a simple task might read from each element of the memory, modify it, and write it back to the same location. In this case, the task can be subdivided trivially at the user defined boundaries. As a specific case, if the user application requests 1 million of these read/modify/writes as the task performed, we can subdivide into two tasks of 500 k threads, four of 250 k etc. This tends towards an optimum where the creation of additional control structures outweighs the latency reduction.

There are also larger groupings of threads having relationships preventing this subdivision. An extreme example is an array of 1 million items that needs to be reversed, in this case each thread will be assigned to swapping the first and last element, second and second from last element, etc.

The code may also be sufficiently complex that one cannot determine the access patterns (NP-complete halting problem), or there may be cases where the access patterns are data driven (provided at runtime a list of indexes for element accesses). This is too computationally intensive for the analysis to pay off, so we will not subdivide further.

A mixture of these cases is seen in real life when dealing with typical applications, and a "best effort" analysis will be used to determine what subdivision should be performed.

Each of these non-dependent tasks have resources associated with them that need to be made consistent on the device upon which the jobs will execute. Thus, the CPU 10 determines what consistency operations need to be performed in order for the tasks to execute successfully on their target device.

In this example, we are considering tasks to be executed on the graphics processing unit 20. Thus, the CPU 10 will determine the non-dependent tasks to be executed on the GPU 20 and will determine what consistency operations need to be performed before each task can be executed. Scheduler 12 will then determine which of these consistency operations has the smallest cost that is, can be executed most quickly and will perform these operations first. It should be noted that by previously subdividing the tasks into small non-dependent tasks the number of consistency operations associated with each task will reduce and thus, the latency caused by awaiting execution of the consistency tasks will fall.

When the consistency operations are complete then the task associated with these consistency operations will be sent to the GPU 20 where it can be executed. The CPU 10 will then perform consistency operations for a further task to be executed on the GPU and when these are complete will transmit the further task to the GPU 20 where it will be stored in the task store 22.

The CPU will then perform consistency operations for a further task and if the task store 22 is full will store these in a low latency or privileged queue 14 that is a queue that is owned by the privileged operating system. This queue may be implemented as a FIFO or as a ring buffer associated with the CPU in the memory 30. It should be noted that if the CPU 10 is communicating with a GPU that does not have a task store 22 then it will store pending tasks in this privileged queue awaiting a signal from the GPU indicating that it is ready for processing a next task.

Figure 2:
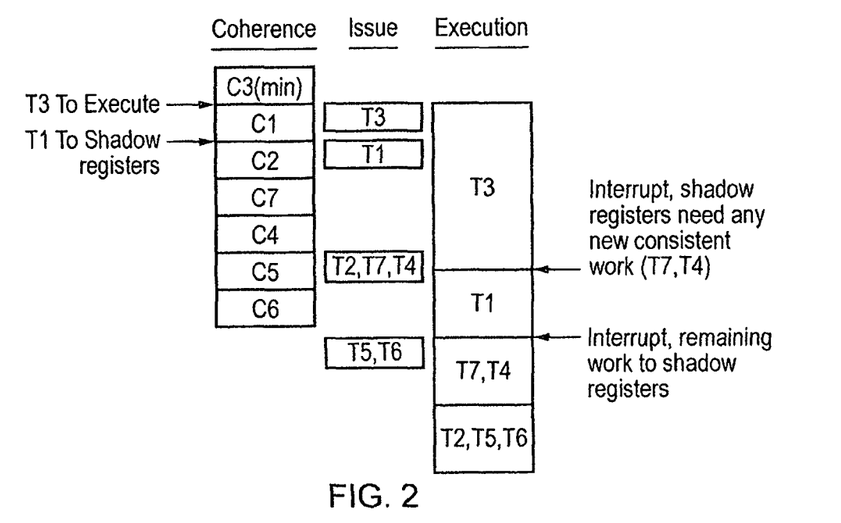
FIG. 2 schematically shows the scheduling of tasks and their associated coherency operations.

FIG. 2 schematically shows the scheduling and execution of tasks and consistency operations for a plurality of tasks. Thus, there are a plurality of tasks T1 to T6 which have a plurality of consistency operations C1 to C6 associated with them. As can be seen consistency operations C3 have the smallest cost and thus, these are performed first and once they have finished T3 is issued for execution by GPU 20. Consistency operations C1 are then performed and when they have completed T1 is issued to the GPU 20 and sits in task store queue 22. In this embodiment the GPU has a two deep queue consisting of two executing registers, which are registers for storing the command that is executing and two shadow registers for storing a command that is pending and these are used as the task store queue. It should be noted this register interface is configured on the bus, and is then stored internally to the GPU at the time that the GPU is signalled to start work on the task, this allows the same registers to be prepared for the next task.

Consistency operations C2, C7 and C4 are then scheduled and when complete tasks T2, T7 and T4 are placed in the privileged queue 14 on the CPU. When the GPU has finished task T3, it transmits an interrupt to the CPU indicating that the shadow registers have capacity. At this point as consistency operations C2, C7 and C4 have completed then the pending tasks T7, T4 and T2 are transmitted and stored in the shadow registers acting as the task store. If tasks are sent together they can be stored together as a list of tasks in one of the shadow registers and in this way the task store can receive a number of tasks together and store them together such that the number of tasks sent at any one time and sitting pending in a queue can be increased.

Task T1 is then executed and when this is complete, there is again a shadow register with capacity and thus, a further interrupt is sent to the CPU and as coherency operations for tasks T5 and T6 that is C5 and C6 have completed, tasks T5 and T6 are ready in the privileged queue and these can be transmitted too.

In this way, the consistency operations for a number of tasks can be performed in advance and these allow the tasks to be performed one after the other without bubbles appearing in the pipeline. Furthermore, if several tasks are ready to be transferred at a same time they can be transferred and stored together reducing bandwidth and storage requirements.

FIG. 3 shows schematically how tasks A and B are non-dependent tasks that can be executed in any order while task C is a task that needs to be executed when they have completed. Thus, tasks A and B are tasks that can be scheduled by the CPU in any order. These tasks are both to be performed by graphics processor GPU 20 and have consistency operations X and Y associated with them. As is shown schematically in this figure consistency operations Y are larger than consistency operations X and thus, the scheduler in the CPU schedules the consistency operations X to be performed first and when these have completed it issues task A to the GPU 20 for execution. Consistency tasks Y are then performed. As in this embodiment there is no task queue on the GPU when consistency tasks Y have completed, task B is stored in the privileged queue awaiting a signal from the GPU indicating that task A has completed. When it receives this signal then task B is transmitted to the GPU for execution.

It should be noted that task B can be put in the privileged queue immediately after the consistency operations Y have completed awaiting a signal from the GPU or in some embodiments the CPU can estimate how long it estimates task A will take and put task B into the queue at about the time that it calculates the GPU will be ready. In this way task B does not sit in the privileged queue for very long and allows other tasks to be placed in the privileged queue.

Once both tasks A and B have completed task C can be processed provided any consistency operations that might be associated with it have completed. These may have been performed during execution of tasks A or B.

Figure 4:
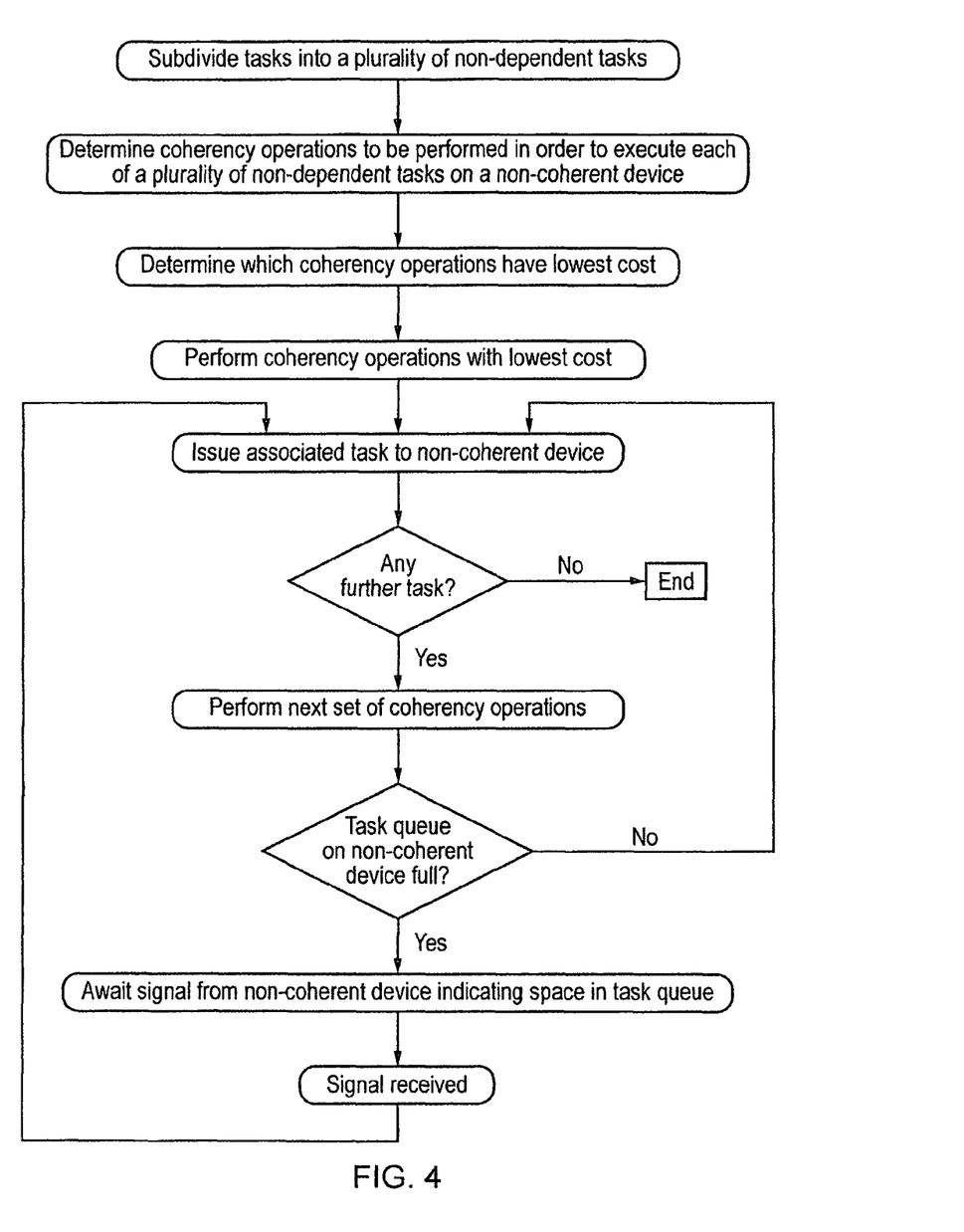
FIG. 4 shows a flow diagram illustrating steps in a method according to an embodiment of the present invention.

FIG. 4 shows a flow diagram illustrating steps in a method according to an embodiment of the present invention.

In this method initially the tasks to be performed are divided into a plurality of non-dependent tasks. This subdivision of tasks is performed to the smallest elementary task.

Then the coherency operations to be performed in order to execute each of the plurality of non-dependent tasks on a non-coherent device are determined. It is then determined which coherency operations have the lowest costs and these coherency operations are performed first.

When they have completed the task associated with them is issued to the non-coherent device and it is determined if there is a further task to be executed. If there is then the next set of coherency operations may be performed. Prior to this in some embodiments, (although not shown in this figure) a step of determining whether or not any previously dependent tasks are now following the completion of the coherency operations, non-dependent. If they are then coherency operations associated with them are added to the list of coherency operations to be performed and may be selected as the next set if their cost is low.

Once the next set of coherency operations have been performed it is determined if the task queue on the non-coherent device is full. If it is full then the task that is now ready to be executed having had its coherency operations performed is queued on the CPU or in the memory awaiting a signal from the non-coherent device indicating that there is space in a task queue or if there is no task queue that the non-coherent device is ready to execute the task. When this signal is received the task is issued to the non-coherent device.

If the task queue on the non-coherent device had not been full then the task associated with the completed coherency operations would be issued to that queue immediately the coherency operations were complete. When there are no further tasks to be issued then the method ends.

Figure 5:
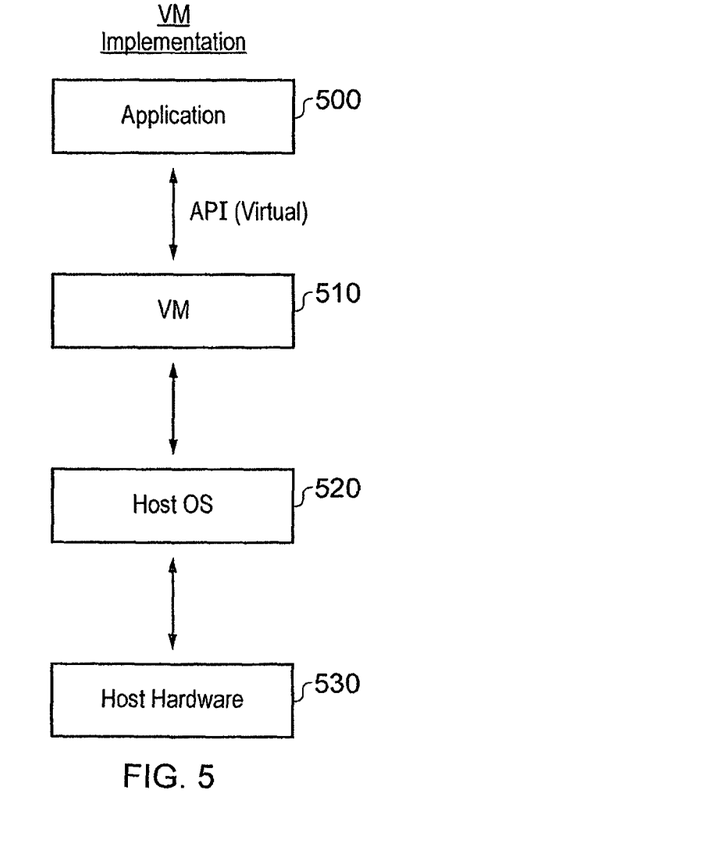
FIG. 5 shows a virtual machine implementation of an embodiment of the present invention.

FIG. 5 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 530 typically running a host operating system 520 supporting a virtual machine program 510. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 510 is capable of executing an application program (or operating system) 500 to give the same results as would be given by execution of the program by such a real hardware device. Thus, the scheduling of tasks to be executed by non-coherent devices may be executed from within the application program 500 using the virtual machine program 510.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A method for scheduling tasks to be processed by one of a plurality of non-coherent processing devices, at least two of said plurality of non-coherent processing devices are heterogeneous devices and at least some of said tasks are targeted to a specific one of said plurality of non-coherent processing devices, said non-coherent processing devices processing data that is stored in local storage and in a memory accessible by at least some of said plurality of non-coherent processing devices, said method comprising:
  for each of a plurality of non-dependent tasks to be processed by said one of said non-coherent processing devices determining consistency operations, wherein said consistency operations are operations required to be performed prior to processing said non-dependent task;
  performing said consistency operations for one of said non-dependent tasks and, on completion, issuing said one of said non-dependent tasks to said one of said non-coherent processing device for processing;
  performing consistency operations for a further non-dependent task such that on completion of said consistency operations said one of said non-coherent processing devices can process said further non-dependent task, wherein a non-dependent task is a task that is independent of all tasks that, prior to processing, require consistency operations to be performed; and
  following said step of performing said consistency operations for said one of said non-dependent tasks, re-evaluating any tasks dependent on said one of said non-dependent tasks to determine which of said any tasks are dependent or non-dependent, before said step of consistency operations for a further non-dependent task is performed and
  wherein said step of determining consistency operations to be performed for each of said plurality of non-dependent tasks including determining which of said plurality of non-dependent tasks has a smallest number of associated consistency operations and performing said smallest number of consistency operations and issuing said non-dependent task having said smallest number of associated consistency operations to one of said non-coherent processing devices before performing other consistency operations for other tasks.

2. A method according to claim 1, wherein said one of said non-coherent processing devices comprises a task queue store for storing at least one task in a queue prior to execution of said task, and on completion of said consistency operations for said further non-dependent task transmitting said further non-dependent task to said one of said non-coherent processing devices to be processed or stored in said task store queue awaiting processing when said one of said non-coherent processing devices is processing an earlier task.

3. A method according to claim 2, further comprising receiving from said one of said non-coherent processing devices an indication that said task queue store has capacity and in response to said indication to transmit any further task that are ready for execution.

4. A method according to claim 2, further comprising receiving from said one of said non-coherent processing devices an indication that said task queue store has capacity and in response to said indication and no task with consistency operations that are complete, noting said indication such that on completion of pending coherency operations a corresponding task can be placed in said queue.

5. A method according to claim 1, comprising an initial step of determining portions of said tasks that can be executed independently of each other and subdividing said tasks where possible into said plurality of non-dependent tasks.

6. A method according to claim 5, wherein said initial step comprises subdividing at least some of said tasks into minimum possible tasks.

7. A method according to claim 5, further comprising a step performed after said initial step, of determining dependencies of said tasks and providing an ordering of said tasks to reduce initial latency.

8. A method according to claim 1, wherein following performing said consistency operations for said further non-dependent task said method stores said further non-dependent task in a privileged queue ready for output to said one of said non-coherent processing devices in response to an indication that it is ready to process said further non-dependent task.

9. A method according to claim 1, wherein said consistency operations comprise at least one of coherency operations and other data transfer operations to ensure consistency between said plurality of non-coherent processing devices and said memory.

10. A method according to claim 1, said method further comprising performing consistency operations for a plurality of further non-dependent tasks and on completion of said consistency operations for each of said plurality of further non-dependent tasks, determining whether said one of said non-coherent processing devices has capacity to receive said further non-dependent task and in response to said one of said non-coherent processing devices having capacity issuing said further non-dependent task to said one of said non-coherent processing devices.

11. A method according to claim 1, wherein said one of said non-coherent processing devices processing said tasks comprises a graphics processing unit with a deep pipeline.

12. A method according to claim 11, wherein said consistency operations are performed on a non-coherent central processing unit.

13. A computer program product storing in a non-transitory storage a program which when executed by a processor will control said processor to perform steps in a method according to claim 1.

14. A data processing apparatus comprising:
  a plurality of non-coherent processing devices configured to process data, at least some of said non-coherent processing devices comprising local data storage, at least two of said non-coherent processing devices are heterogeneous devices and at least some tasks performed by said data processing apparatus are targeted to a specific one of said plurality of non-coherent processing devices;
  a memory configured to store data accessible by at least some of said plurality of non-coherent processing devices; and
  scheduling circuitry configured to store said tasks to be performed by at least one of said plurality of non-coherent processing devices,
  said scheduling circuitry configured for each of a plurality of non-dependent tasks to be executed by one of said non-coherent processing devices to determine consistency operations and to schedule performance of said consistency operations and, on completion, to issue said non-dependent task to be executed by said one of said non-coherent processing devices and to perform consistency operations for a further non-dependent task, wherein said consistency operations are operations required to be performed prior to execution of said non-dependent task, and a non-dependent task is a task that is independent of all tasks that, prior to processing, require consistency operations to be performed, wherein said scheduling circuitry is configured, following completion of said consistency operations for one of said non-dependent tasks, to evaluate said tasks dependent on said one of said non-dependent tasks and, in response to determining that any of said evaluated tasks are now non-dependent, to include consistency operations for said tasks that are now non-dependent when scheduling performance of said consistency operations, and wherein said scheduling circuitry is configured to determine which of said plurality of non-dependent tasks has a lowest number of associated consistency operations and said scheduling circuitry configured to schedule said lowest number of consistency operations to be performed as a first set of consistency operations and, on completion of said first set of consistency operations, issuing a non-dependent task to be executed.

15. A data processing apparatus according to claim 14, wherein said non-coherent processing device comprises a data store configured to store at least one pending task as a task queue store, said scheduling circuitry being configured to issue said further non-dependent task on completion of corresponding consistency operations for said further non-dependent task, said further non-dependent task being stored in said task queue when said one of said non-coherent processing devices is processing an earlier task.

16. A data processing apparatus according to claim 15, wherein said scheduling circuitry is configured in response to receiving from said one of said non-coherent processing devices an indication that said task queue store has capacity to transmit any further tasks that are ready for execution.

17. A data processing apparatus according to claim 15, wherein said scheduling circuitry is configured to receive a signal from said one of said non-coherent processing devices indicating when said task queue store has capacity to store a task and in response to said indication and no task with coherent operations that are complete, to schedule coherent operations for a further task to start.

18. A data processing apparatus according to claim 14, wherein said scheduling circuitry is further configured to determine portions of said tasks that can be executed independently of each other and subdivide said tasks where possible into said plurality of non-dependent tasks.

19. A data processing apparatus according to claim 14, said data processing apparatus comprising a privileged queue for storing tasks to be performed by at least one of said plurality of non-coherent processing devices, said scheduling circuitry being configured to store said further non-dependent task in said privileged queue ready for output to said one of said non-coherent devices on completion of corresponding consistency operations for said further non-dependent task when said one of said non-coherent devices has not completed said task.

20. A data processing apparatus according to claim 14, wherein said consistency operations comprise at least one of coherency operations and other data transfer operations to ensure consistency between said plurality of non-coherent processing devices and said memory.

21. A data processing apparatus according to claim 14, wherein said scheduling circuitry is configured to perform consistency operations for a plurality of further non-dependent tasks and on completion of said consistency operations for each of said plurality of further non-dependent tasks, determining whether said one of said non-coherent processing devices has capacity to receive said further non-dependent task of said plurality of further non-dependent tasks and, in response to said one of said non-coherent processing devices having capacity issuing said further non-dependent task to said one of said non-coherent processing devices.

22. A data processing apparatus according to claim 14, wherein said one of said non-coherent processing devices comprises a graphics processing unit with a deep pipeline.

23. A data processing apparatus according to claim 14, comprising a central processing unit, said central processing unit being configured to perform said consistency operations in response to a request from said scheduling circuitry.

24. A computer program product storing in a non-transitory storage a computer program for controlling a computer to provide a virtual machine execution environment for program instructions corresponding to a data processing apparatus as claimed in claim 14.

* * * * *